United States Patent [19]
Song et al.

[11] Patent Number: 6,157,353
[45] Date of Patent: Dec. 5, 2000

[54] RECEIVER WITH MINIATURE VIRTUAL IMAGE DISPLAY

[75] Inventors: John Song, Chandler; Curtis D. Moyer, Phoenix; Karen E. Jachimowicz, Goodyear, all of Ariz.

[73] Assignee: Motorola, Inc., Schaumburg, Ill.

[21] Appl. No.: 08/231,570

[22] Filed: Apr. 22, 1994

Related U.S. Application Data

[62] Division of application No. 07/767,178, Sep. 30, 1991, abandoned.

[51] Int. Cl.⁷ ........................................................ G09G 3/00
[52] U.S. Cl. .................................. 345/32; 345/1; 345/44; 345/82; 379/93.17
[58] Field of Search ........................... 345/44, 32, 82, 345/38, 40, 1, 39; 340/825.44, 815.13; 379/58, 59, 61, 96, 433, 93.17, 93.19, 93.23, 110.01; 359/804; 385/120; 313/500

[56] References Cited

U.S. PATENT DOCUMENTS

| | | | |
|---|---|---|---|
| 4,076,978 | 2/1978 | Brennan et al. | 385/120 |
| 4,115,770 | 9/1978 | Lowell | 379/96 |
| 4,481,382 | 11/1984 | Villa-Real | 379/61 |
| 5,023,905 | 6/1991 | Wells et al. | 379/110 |
| 5,051,738 | 9/1991 | Tanielian et al. | 313/500 |
| 5,119,414 | 6/1992 | Izumi | 379/354 |
| 5,124,548 | 6/1992 | Igaki | 250/231.16 |
| 5,130,853 | 7/1992 | Sakurai | 359/804 |

FOREIGN PATENT DOCUMENTS

| | | | |
|---|---|---|---|
| 1532286 | 11/1978 | United Kingdom | 313/500 |
| 8606238 | 10/1986 | WIPO . | |

*Primary Examiner*—Lun-Yi Lao
*Attorney, Agent, or Firm*—Eugene A. Parsons; William E. Koch

[57] ABSTRACT

A portable communications receiver with virtual image display including a semiconductor array providing a real image and an optical system mounted to receive the real image and produce a virtual image at a viewing aperture. Electronics are associated with the array to produce real images in accordance with messages received by the receiver. The display is sufficiently small to mount in a hand held microphone for viewing by the operator while using the microphone.

18 Claims, 6 Drawing Sheets

RECEIVER WITH MINIATURE VIRTUAL IMAGE DISPLAY

This is a division of application Ser. No. 07/767,178, filed Sep. 30, 1991, now abandoned.

The present invention pertains to portable communications receivers and more particularly to visual displays with portable communications receivers.

BACKGROUND OF THE INVENTION

Portable communications receivers, such as radios, cellular and cordless telephones, pagers and the like, are becoming increasingly popular. In many instances it is desirable to provide a visual display on the receiver to supply the operator with a visual message. The problem is that visual displays require relatively high electrical power and require a great amount of area to be sufficiently large to produce a useful display.

In the prior art, for example, it is common to provide visual displays utilizing liquid crystal displays, directly viewed light emitting diodes, etc. These produce very large and cumbersome displays that greatly increase the size of the receiver and require relatively large amounts of power.

In one instance, the prior art includes a scanning mirror to produce a visual display but again this requires relatively large amounts of power and is very complicated and sensitive to shock. Also, the scanning mirror causes vibration in the unit which substantially reduces visual comfort and acceptability.

SUMMARY OF THE INVENTION

It is an object of the present invention to provide a new and improved portable communications receiver with miniature virtual image display.

It is a further object of the present invention to provide a new and improved portable communications receiver with miniature virtual image display which substantially reduces the amount of power required.

It is a further object of the present invention to provide a new and improved portable communications receiver with miniature virtual image display requiring substantially less space to provide a useful and easily viewable display.

These and other objects and advantages are realized in a portable communications receiver including a communications receiver and a miniature virtual image display having a viewing aperture, the display being operably attached to the receiver and including image generation apparatus for providing a real image and a fixed optical system for producing, from the real image, a virtual image viewable through the viewing aperture.

BRIEF DESCRIPTION OF THE DRAWINGS

Referring to the drawings.

DESCRIPTION OF THE PREFERRED EMBODIMENTS

Figure 1A:
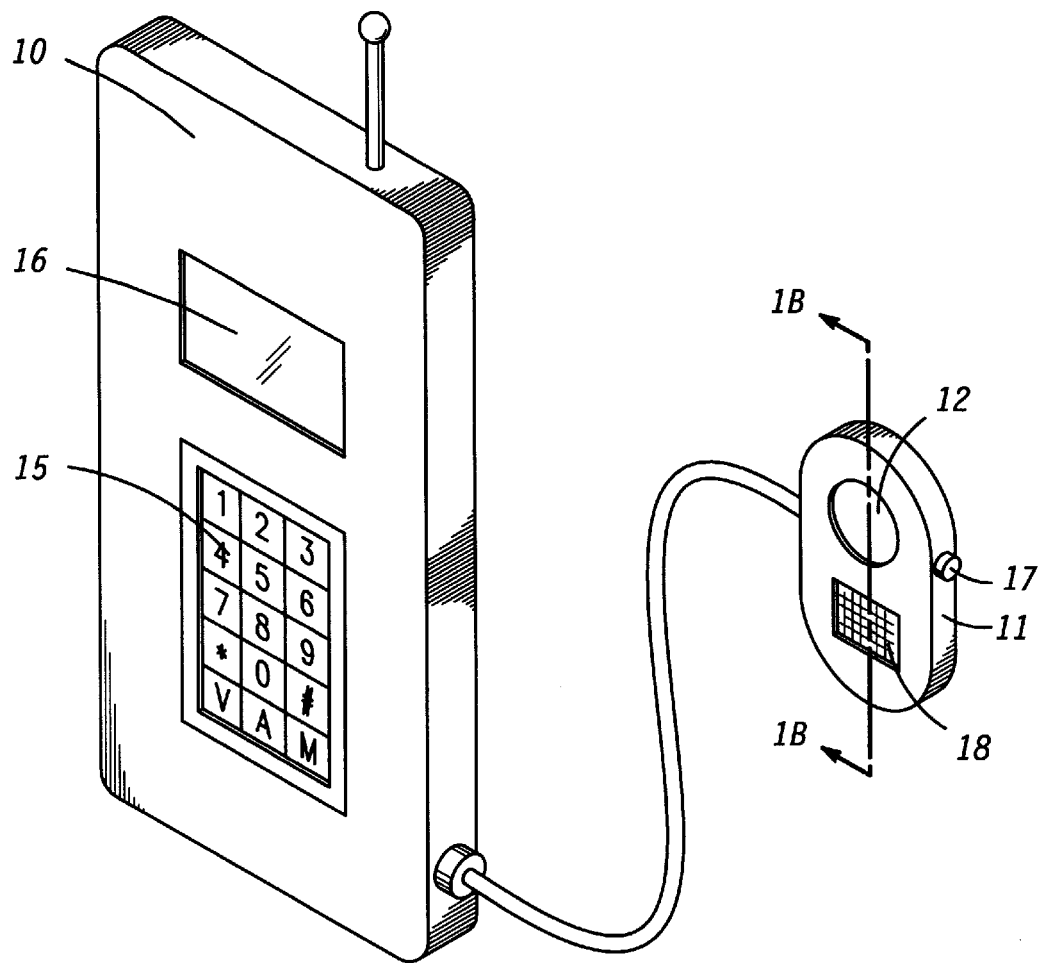
FIG. 1A is a view in perspective of a portable communications receiver embodying the present invention.

FIG. 1A, illustrates a portable communications receiver 10 having a hand held microphone 11 with a miniature virtual display 12 mounted therein It will of course be understood that portable communications receiver 10 can be any of the well known portable receivers, such as a cellular or cordless telephone, a two-way radio, a pager, etc. In the present embodiment, for purposes of explanation only, portable communications receiver 10 is a portable two-way police radio, generally the type carried by police officers on duty or security guards. Portable communications receiver 10 includes a control panel 15 for initiating calls and a standard visual display 16, if desired, for indicating the number called or the number calling. Alternately, 16 includes a speaker in addition to or instead of the visual display. Hand held microphone 11 has a push-to-talk switch 17 and a voice pick-up 18.

Figure 1B:
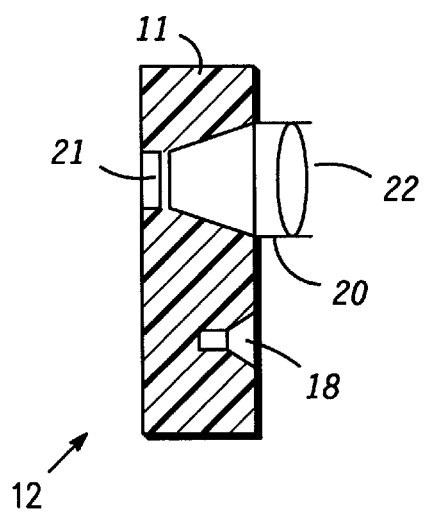
FIG. 1B is a simplified view as seen from the line 1B—1B in FIG. 1A.

Referring to FIG. 1B, a simplified sectional view of hand held microphone 11, as seen from the line 1B—1B, is illustrated. Miniature virtual display 12 includes image generation apparatus 21 for providing a real image to a fixed optical system 20, which in turn produces a virtual image viewable by the operator through an aperture 22. Fixed optical system 20 is constructed to magnify the entire real image from image generation apparatus 21, without utilizing moving parts, so that the virtual image viewable through aperture 22 is a complete frame, or picture, which appears to be very large and is easily discernable by the operator. By producing a virtual image from the very small real image of the apparatus 21, fixed optical system 20 is relatively small and adds virtually no additional space requirements to hand held microphone 11. Optical system 20 is constructed with no moving parts, other than optional features such as focusing, zoom lenses, etc. Further, apparatus 21 requires very little electrical power to generate the real image and, therefore, adds very little to the power requirements of portable communications receiver 10.

Figure 2A:
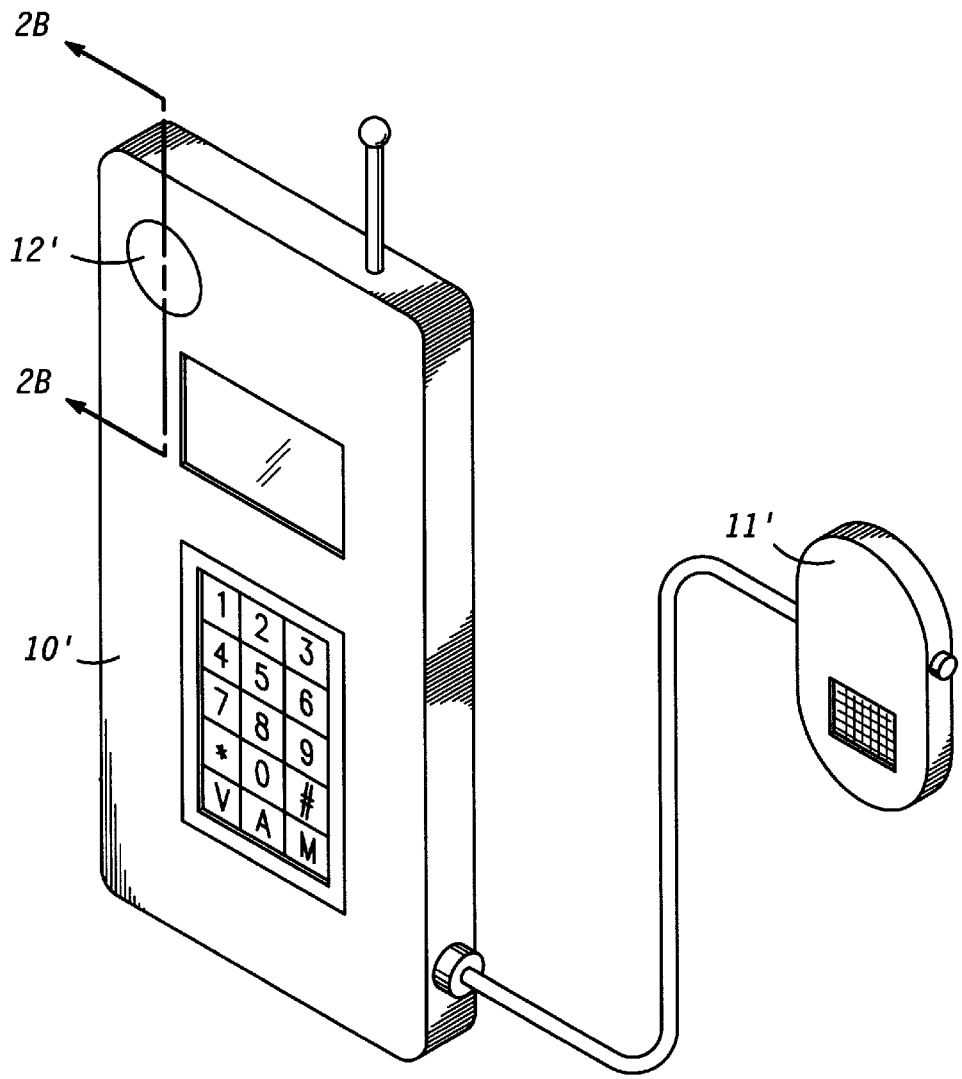
FIG. 2A is a view in perspective, similar to FIG. 1, of another embodiment of the present invention.
Figure 2B:
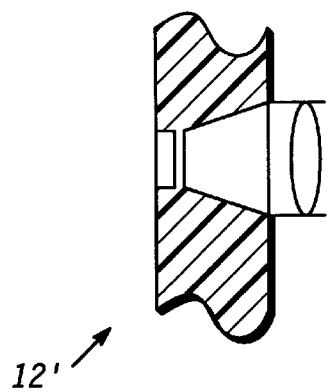
FIG. 2B is a simplified view as seen from the line 2B—2B in FIG. 2A.

Referring specifically to FIGS. 2A and 2B, a second embodiment is illustrated wherein similar parts are designated with similar numbers with a prime added to the numbers to indicate a different embodiment. In this embodiment a portable communications receiver 10' has a miniature virtual display 12' included in the body thereof, instead of in a hand held microphone 11'. Hand held microphone 11' is optional and this specific embodiment is desirable for instances where a hand held microphone is not utilized or not available. Miniature virtual display 12' is basically similar to miniature virtual display 12 of FIGS. 1A and 1B and adds very little to the size, weight, or power consumption of receiver 10'.

Figure 3:
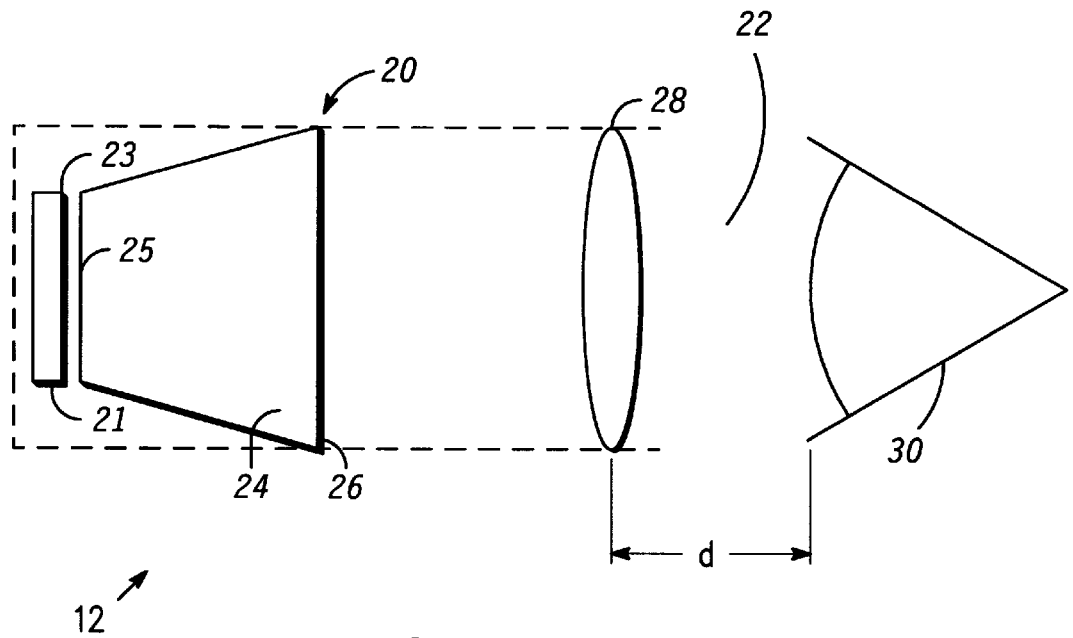
FIG. 3 is a simplified schematic view of a miniature virtual image display included in the portable communications receiver of FIG. 1.

Referring to FIG. 3, a specific miniature virtual image display 12 is illustrated in a simplified schematic view. Display 12 includes apparatus 21 for providing a real image on a surface 23. Fixed optical system 20, in this specific embodiment includes a coherent bundle 24 of optical fibers and a lens system. Bundle 24 has a first surface 25 positioned adjacent the surface 23 of apparatus 21 and a second surface 26 defined at the opposite end of bundle 24. Lens 28, representing the lens system, is positioned in spaced relation to surface 26 of bundle 24 and, in cooperation with bundle 24, produces a virtual image viewable by an eye 30 spaced from a viewing aperture 22 generally defined by lens 28.

Figure 4:
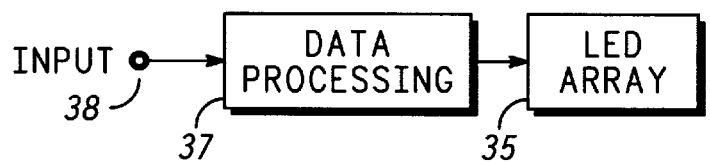
FIG. 4 is a simplified block diagram of electronics associated with the miniature virtual image display of FIG. 3.

Apparatus 21 is illustrated in more detail in FIG. 4 and includes, for example, semiconductor electronics such as a light emitting diode (LED) array 35 driven by data processing circuits 37. Data processing circuits 37 include, for example, logic and switching circuit arrays for controlling each LED in LED array 35. Data processing circuits 37 include, in addition to or instead of the logic and switching arrays, a microprocessor or similar circuitry for processing input signals to produce a desired real image on a device such as LED array 35.

Figure 5:
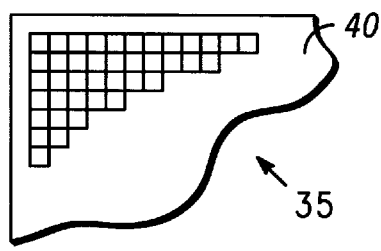
FIG. 5 is an enlarged view in top plan of an LED array, portions thereof broken away, forming a portion of the electronics of FIG. 4.

In this specific embodiment LED array 35 is utilized because of the extremely small size that can be achieved and because of the simplicity of construction and operation. It will of course be understood that other image generating devices may be utilized, including but not limited to lasers, field emission devices, etc. Referring specifically to FIG. 5, a plan view of LED array 35 is illustrated in which pixels are formed in a regular pattern of rows and columns on a single semiconductor chip 40. Each pixel includes at least one LED, with additional parallel LEDs being included, if desired, for additional brightness and redundancy. By addressing specific pixels by row and column in a well known manner, the specific pixels are energized to produce a real image. Digital or analog data is received at input terminal 38 and converted by data processing circuits 37 into signals capable of energizing selected pixels to generate the predetermined real image.

It will be understood by those skilled in the art that LED array 35 and semiconductor chip 40 are greatly enlarged in the FIGS. The actual size of semiconductor chip 40 is on the order of a few milli-meters along each side with each LED being on the order of as little as one micron on a side. As the semiconductor technology reduces the size of the chip, greater magnification and smaller lens systems are required. Reducing the size of the lenses while increasing the magnification results in greatly limiting the field of view, substantially reducing eye relief and reducing the working distance of the lens system.

Surface 25 of bundle 24 is positioned adjacent LED array 35 so as to pick up real images generated thereby and transmit the image by way of the optical fibers to surface 26. Bundle 24 is tapered along the length thereof so that the image at surface 26 is larger than the real image at surface 25. The taper in the present embodiment provides an image at surface 26 which is twice as large as the image at surface 25, which is equivalent to a power of two magnification. It will be understood by those skilled in the art that additional magnification (taper) may be included if desired.

The lens system, represented schematically by lens 28, is mounted in spaced relation from surface 26 of bundle 24 so as to receive the image from surface 26 and magnify it an additional predetermined amount. In the present embodiment, lens 28 magnifies the image another ten times (10×) so that the real image from LED array 35 is magnified a total of twenty times. It will of course be understood that the lens system may be adjustable for focus and additional magnification, if desired, or may be fixed in a housing for simplicity. Because the image received by lens 28 from bundle 24 is much larger than LED array 35, the lens system does not provide the entire magnification and, therefore, is constructed larger and with less magnification. Because of this larger size, the lens system has a larger field of view and a greater working distance.

Eye relief is the distance that eye 30 can be positioned from viewing aperture 22 and still properly view the image, which distance is denoted by "d" in FIG. 3. Because of the size of lens 28, eye relief, or the distance d, is sufficient to provide comfortable viewing and in the present embodiment is great enough to allow a viewer to wear normal eyeglasses, if desired. Because the operator can wear normal corrective lenses (personal eyeglasses), focusing and other adjustable features are not required and, therefore, virtual image display 12 can be constructed very simply and inexpensively.

Figure 6:
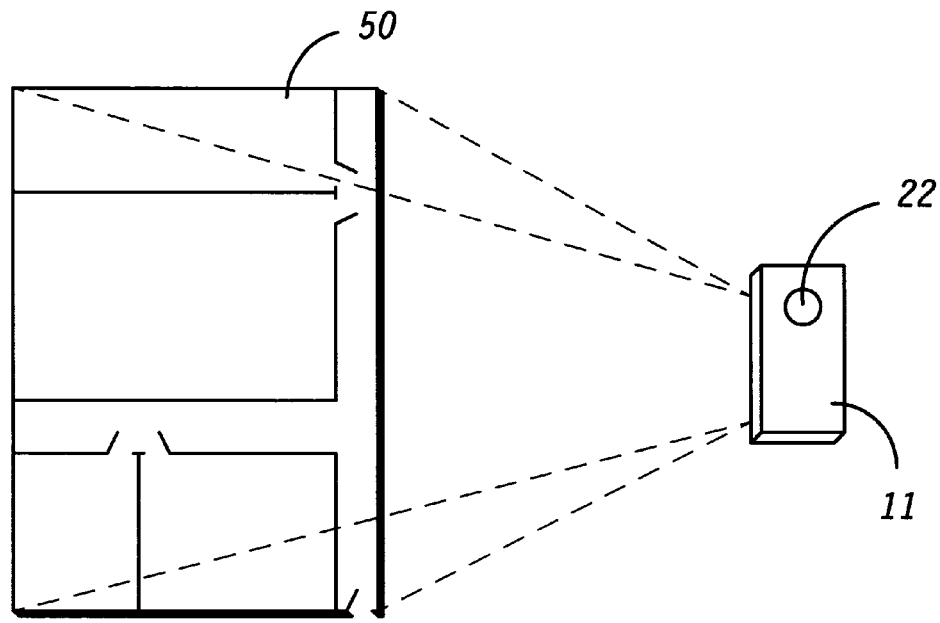
FIG. 6 is a view in perspective illustrating a typical view as seen by the operator of the portable communications receiver of FIG. 1.

FIG. 6 is a perspective view of hand held microphone 11 illustrating a typical view 50 seen by an operator looking into viewing aperture 22 of miniature virtual image display 12. View 50 could be, for example, a floor plan of a building about to be entered by the operator (a policeman). The floor plan is on file at the police station and, when assistance is requested by the policeman, the station simply transmits the previously recorded plan. Similarly, miniature virtual image display 12 might be utilized to transmit pictures of missing persons or wanted criminals, maps, extremely long messages, etc. Many other variations, such as silent receiver operation wherein the message appears on display 12 instead of audibly, are possible.

Figure 7:
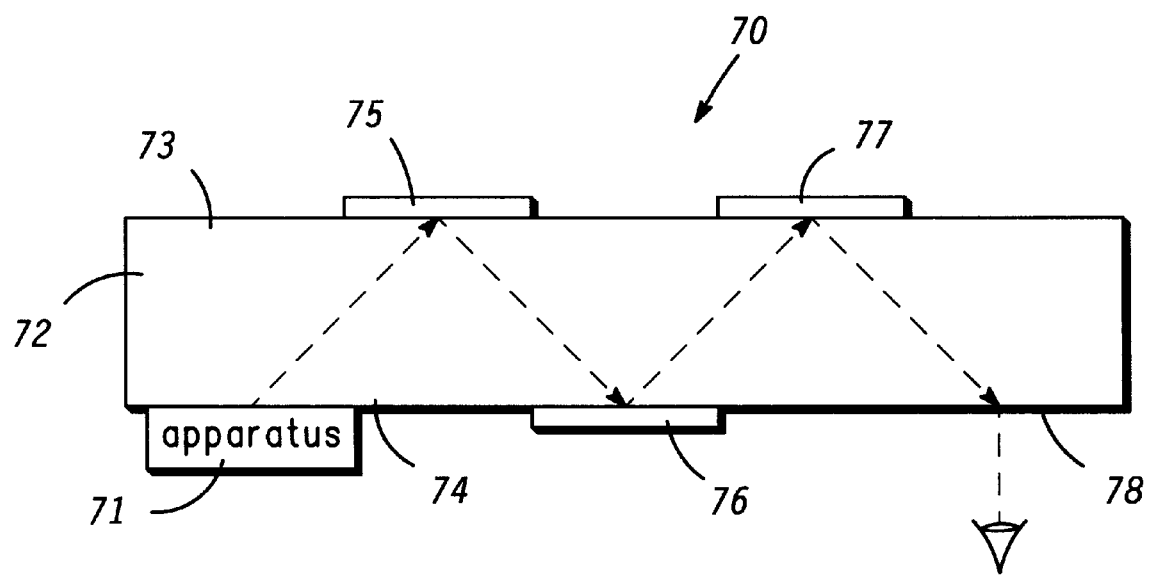
FIGS. 7, 8 and 9 are additional simplified schematic views, similar to FIG. 3, of other miniature virtual image displays useable in the portable communications receivers of FIGS. 1A through 2B.

Referring to FIG. 7, another specific miniature virtual image display 70 is illustrated in a simplified schematic view. In waveguide virtual image display 70 image generation apparatus 71, similar to apparatus 21 described above, is affixed to the inlet of an optical waveguide 72 for providing a real image thereto. Light rays from the real image at apparatus 71 are directed angularly toward a predetermined area on a first side 73 where they are reflected back toward a second side 74 generally along an optical path defined by sides 73 and 74. Three diffractive lenses 75, 76 and 77 are affixed to sides 73 and 74 at the next three predetermined areas, respectively, to which the reflected light rays are directed. Diffractive lenses 75, 76, and 77 provide the required amount of magnification so that a virtual image of a desired size is viewable at an aperture 78 defined by the outlet of optical waveguide 72.

Figure 8:
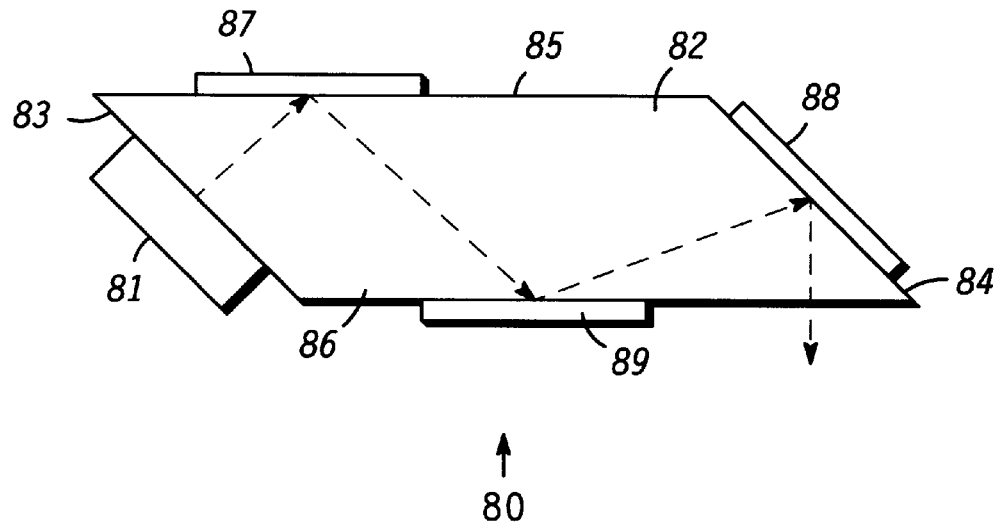

Referring to FIG. 8, another specific miniature virtual image display 80 is illustrated in a simplified schematic. In waveguide virtual image display 80, image generation apparatus 81, similar to apparatus 21 described above, is affixed to the inlet of an optical waveguide 82 for providing a real image thereto. Waveguide 82 is formed generally in the shape of a parallelogram (side view) with opposite sides, 83, 84 and 85, 86, equal and parallel but not perpendicular to adjacent sides. Side 83 defines the inlet and directs light rays from the real image at apparatus 81 onto a predetermined area on an adjacent side 85 generally along an optical path defined by all four sides. Three diffractive lenses 87, 88 and 89 are positioned along adjacent sides 85, 84 and 86, respectively, at three predetermined areas and the magnified virtual image is viewable at an outlet in side 86. This particular embodiment illustrates a display in which the overall size is reduced somewhat and the amount of material in the waveguide is reduced to reduce weight and material utilized.

Figure 9:
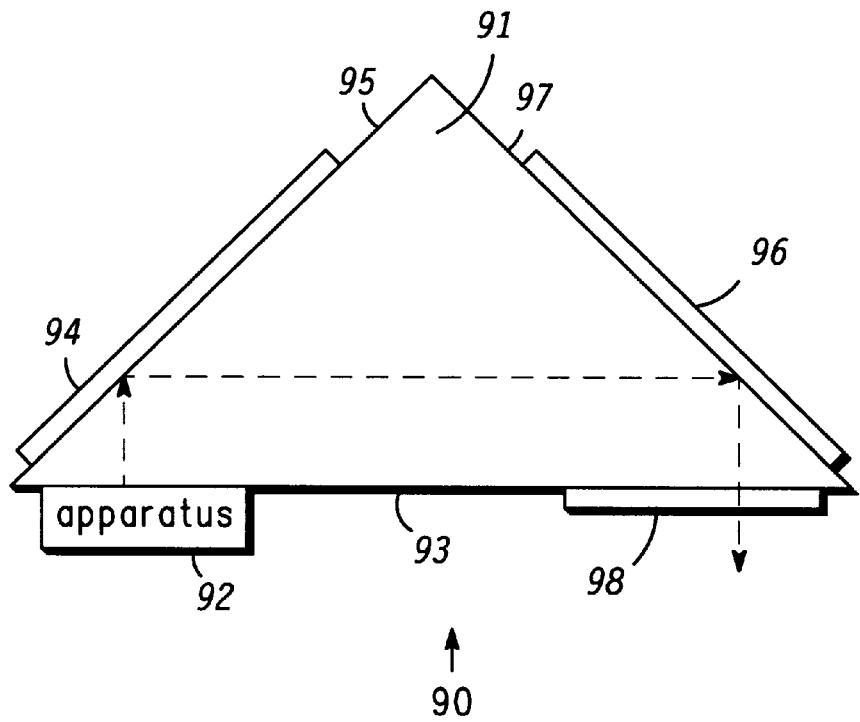

Referring to FIG. 9, another specific miniature virtual image display 90 is illustrated in a simplified schematic. In waveguide virtual display 90 an optical waveguide 91 having a generally triangular shape in side elevation is utilized. Image generation apparatus 92, similar to apparatus 21 described above, for producing a real image is affixed to a first side 93 of optical waveguide 91 and emanates light rays which travel along an optical path directly to a diffractive lens 94 affixed to a second side 95. Light rays are reflected from lens 94 to a diffractive lens 96 mounted on a third side 97. Lens 96 in turn reflects the light rays through a final diffractive lens 98 affixed to the outlet of optical waveguide 91 in side 93, which lens 98 defines a viewing aperture for display 90. In this particular embodiment the sides of display 90 are angularly positioned relative to each other so that light rays enter and leave the inlet and outlet, respectively, perpendicular thereto.

Miniature virtual image display 12, described above, is described in more detail in a copending application entitled "Compact Virtual Image Display", filed of even date herewith and assigned to the same assignee. Also, miniature virtual image displays 70, 80 and 90, along with other miniature virtual image displays that can be utilized in conjunction with the present invention, are described in more detail in a copending patent application entitled "Waveguide Virtual Image Display", filed of even date herewith and assigned to the same assignee.

Figure 10A:
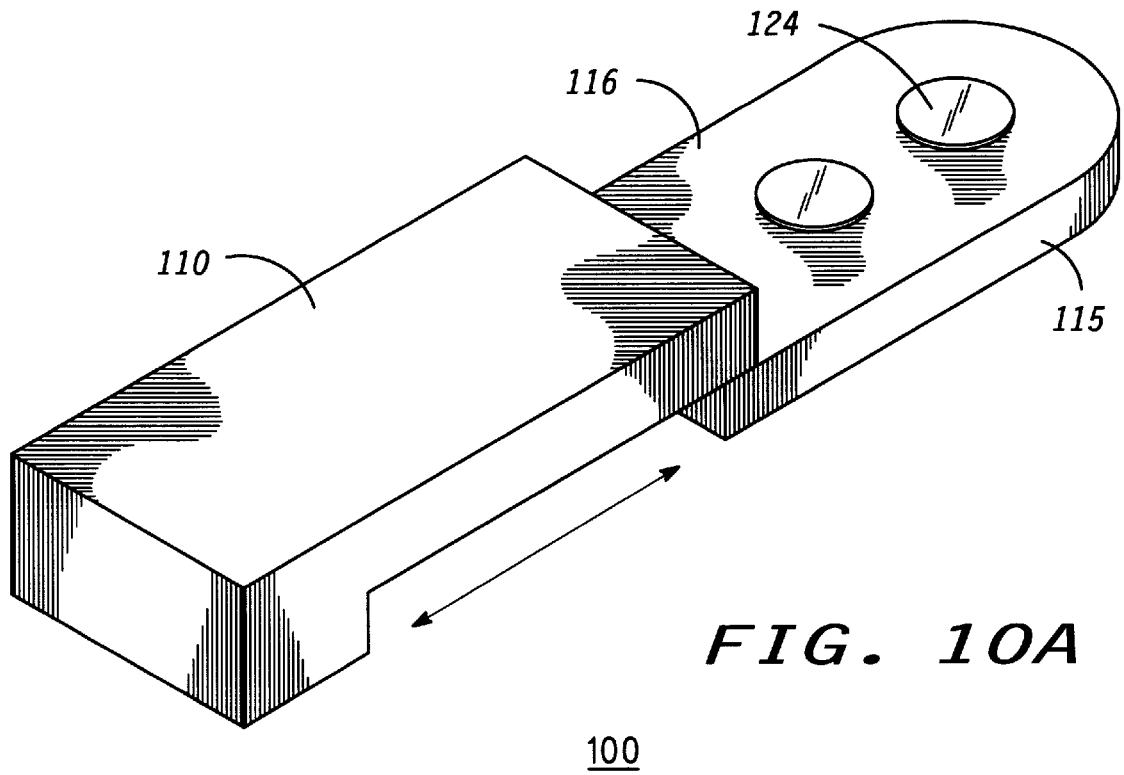
FIGS. 10A and 10B are perspective and side elevational views, respectively, of another communications receiver embodying the present invention.
Figure 10B:
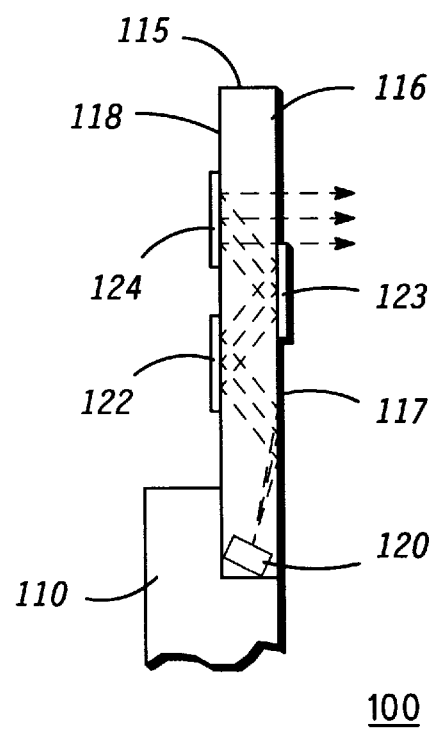

Referring specifically to FIGS. 10A and 10B, another communications receiver 100, embodying the present invention is illustrated in perspective and side elevation, respectively. Communications receiver 100 includes, for example, a pager 110 with miniature virtual image display 115 slideably attached thereto. Miniature virtual image display 115 includes an optical waveguide 116 having parallel spaced apart sides 117 and 118. Image generation apparatus 120, which is similar to apparatus 21 in FIG. 2, is positioned adjacent an inlet defined at one end of optical waveguide 116. Light rays enter optical waveguide 116 at an angle to side 117 and are reflected a plurality of times between sides 117 and 118. Optical waveguide 116 defines an optical path therethrough.with predetermined reflection areas spaced apart therealong.

Three diffractive optical elements 122, 123 and 124 are positioned along optical waveguide 116 at three predetermined reflection areas and provide a required amount of magnification, aberration correction and/or filtering. Light rays are reflected from final diffractive optical element 124 to an outlet which defines a viewing aperture through which the operator can view the enlarged virtual image. In this specific embodiment miniature virtual image display 115 is constructed to slide into and out of the body of pager 110 to reduce the over-all size during nonuse.

It should be noted that in the prior art, pagers and other small receivers in which visual displays are desired are especially handicapped by the size of the displays. Generally such displays are limited to a single short line of text, and the size of the display still dictates the size of the receiver. Utilizing an embodiment of the present invention, a display with several lines of text can be incorporated and the size of the receiver can be substantially reduced. Further, the display is clearer and easier to read.

Thus a greatly improved portable communications receiver with miniature virtual image display is disclosed, which incorporates an extremely small LED array or other semiconductor chip device. Because a virtual image display is utilized, the display is constructed very small and requires very little power. Further, because of the extremely small size and power consumption of the virtual image display, it is incorporated into a portable radio without substantially effecting the size or power requirements. The miniature virtual display provides a predetermined amount of magnification along with sufficient eye relief and lens working distance to create a comfortable and viewable virtual image. Also, a complete virtual image is produced with no moving parts or power consuming motors and the like. Further, the electronics provided as a portion of the miniature virtual image display allows a variety of very small real images to be generated, which can be easily and comfortably viewed by an operator. The very small real image is magnified into a large virtual image that is easily perceived by the operator.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. A portable communications receiver with multiple visual displays comprising a portable communications receiver with a miniature virtual image display having a viewing aperture, the miniature virtual image display being operably attached to the receiver and including image generation apparatus for providing a real image and a fixed optical system for producing, from the real image, a virtual image viewable through the viewing aperture and a direct visual display operably attached to the receiver.

2. A portable communications receiver with multiple visual displays as claimed in claim 1 wherein the image generation apparatus includes a semiconductor device array defining a plurality of pixels with at least one semiconductor device in each pixel and image forming electronics connected to the pixels and to the portable communications receiver, the semiconductor device array producing the real image in accordance with signals received from the portable communications receiver.

3. A portable communications receiver with multiple visual displays as claimed in claim 1 wherein the semiconductor device array includes light emitting diodes.

4. A portable communications receiver with multiple visual displays as claimed in claim 1 wherein the optical system is further constructed to provide eye relief sufficient to allow an operator to use personal eye glasses when viewing the virtual image in the viewing aperture.

5. A portable communications receiver with multiple visual displays as claimed in claim 1 wherein the portable communication receiver includes a hand held microphone and the virtual image display is mounted in the hand held microphone.

6. A portable electronic device with visual displays comprising:
    a portable electronic device;
    a miniature virtual image display electrically connected to the electronic device for receiving video data therefrom and having a viewing aperture, the display including image generation apparatus for providing a real image, and
    an optical system mounted adjacent the image generation apparatus to receive the real image therefrom, magnify the image and produce a virtual image at the viewing aperture, the optical system producing a magnification sufficient to easily perceive the virtual image through the viewing aperture; and a direct visual display electrically connected to the electronic device for receiving data therefrom and providing a direct view display thereof.

7. A portable electronic device with visual displays as claimed in claim 6 wherein the optical system includes a bundle of fiber optics defining a first and a second surface and tapered to provide a predetermined amount of magnification from the first surface to the second surface, the bundle of fiber optics being mounted with the first surface positioned in juxtaposition to the real image provided by the image generation apparatus, and a lens system mounted adjacent the bundle of fiber optics to receive an image from the second surface thereof, further magnify the image and produce a virtual image at the viewing aperture.

8. A portable electronic device with visual displays as claimed in claim 7 wherein the bundle of fiber optics is tapered sufficiently to provide magnification of at least a power of two.

9. A portable electronic device with visual displays as claimed in claim 7 wherein the lens system is constructed to further magnify the image by a power of at least ten.

10. A portable electronic device with visual displays as claimed in claim 6 wherein the image generation apparatus providing the real image is formed in a single semiconductor chip.

11. A portable electronic device with visual displays as claimed in claim 10 wherein the apparatus providing the real image includes a two dimensional light emitting diode array.

12. A portable electronic device with visual displays as claimed in claim 6 including in addition image forming electronics connected to the apparatus providing the real image and to the portable electronic device, the apparatus producing the real image in accordance with signals received from the portable electronic device.

13. A portable electronic device with visual displays as claimed in claim 6 wherein the direct visual display includes a liquid crystal display.

14. A portable electronic device with visual displays as claimed in claim 6 wherein the apparatus providing the real image includes semiconductor lasers.

15. A portable electronic device with visual displays as claimed in claim 6 wherein the portable electronic device includes a portable communications receiver.

16. A portable communications device with multiple visual displays comprising:

a portable communication device; and a miniature virtual image display having a viewing aperture, the display being operably attached to the communications device for visually displaying signals received from the communications device and including image generation apparatus, the image generation apparatus including a two dimensional semiconductor device array formed on a single semiconductor chip and defining a plurality of rows and columns of pixels in sufficient number to generate a real image of one of a complete picture and several lines of text, the real image being of a size to require magnification to be perceivable with the human eye, a fixed optical system for producing, from the real image, a magnified virtual image viewable and perceivable by an operator through the viewing aperture, the semiconductor device array and the optical system of the miniature visual display providing a virtual image easily perceived by an operator without substantially effecting the size and power requirements of the portable communications device; and a direct visual display electrically connected to the communications device for receiving data therefrom and providing a direct view display thereof.

17. A portable communications device with a multiple visual displays as claimed in claim 16 wherein the real image is of a size to require at least a power of ten magnification to be perceivable with the human eye and the fixed optical system is designed to produce a magnified virtual image greater than ten times the real image.

18. A method of operating a portable communications receiver with multiple visual displays comprising the steps of:

providing a portable communications receiver with a miniature virtual image display having a viewing aperture, the miniature virtual image display being operably attached to the receiver and including image generation apparatus for providing a real image and a fixed optical system for producing, from the real image, a virtual image viewable through the viewing aperture and a direct visual display operably attached to the receiver;

coupling numbers called to the direct visual display; and coupling received signals representative of large alphanumeric and pictorial messages to the miniature virtual image display.

* * * * *